United States Patent [19]

Kurz

[11] 4,087,285
[45] May 2, 1978

[54] METHOD FOR STRENGTHENING VITREOUS PRODUCTS AND COMPOSITION BOARDS

[76] Inventor: Fredrik Wilhelm Anton Kurz, Nysatravagen 12, S-181 61 Lidingo, Sweden

[21] Appl. No.: 585,057

[22] Filed: Jun. 9, 1975

Related U.S. Application Data

[63] Continuation of Ser. No. 366,113, Jun. 1, 1973, abandoned.

[51] Int. Cl.² .............................................. C03C 3/04
[52] U.S. Cl. ............................. 106/52; 106/73.5; 106/73.6; 106/97; 106/98; 106/100; 106/109; 106/110; 106/118; 106/DIG. 1; 106/DIG. 8; 65/134; 264/122; 264/DIG. 49
[58] Field of Search ............ 106/52, 73.5, 73.6, 106/97, 98, 109, 118, DIG. 1, DIG. 8, 100, 110; 65/134; 264/122, DIG. 49

[56] References Cited

U.S. PATENT DOCUMENTS

| | | | |
|---|---|---|---|
| 2,366,473 | 1/1945 | Bair | 65/134 |
| 2,410,954 | 11/1946 | Sharp | 106/98 |
| 2,699,409 | 1/1955 | Hashimoto | 106/40 R |
| 2,785,988 | 3/1957 | Lipkind et al. | 106/109 |
| 2,892,240 | 6/1959 | Frankenhoff | 106/73.6 |
| 2,987,411 | 6/1961 | Minnick | 106/41 |
| 3,354,245 | 11/1967 | Foster | 106/73.6 |
| 3,565,650 | 2/1971 | Cordon | 106/97 |
| 3,776,992 | 12/1973 | Miki | 264/122 |

FOREIGN PATENT DOCUMENTS

2,239 of 1913 United Kingdom ............... 106/118

OTHER PUBLICATIONS

"The Condensed Chemical Dictionary" 8th ed. Van Nostrand Reinhold Co. 1971.
Dziob et al. "Utility of Z Clay, Electrofilter Dusts from the Turow Power Plant and Koalin Residues as Raw Materials for the Production of Tiles" Chem. Abst. 75 9388p (Jul. 5, 1971), p. 229; and English Translation of Articles.
"One Page Chart Sums up Characteristics of Fine Particles," C. E. Lapple, Chemical Engineering, Jun. 11, 1962, pp. 206-207.

*Primary Examiner*—Winston A. Douglas
*Assistant Examiner*—John P. Sheehan
*Attorney, Agent, or Firm*—Stevens, Davis, Miller & Mosher

[57] ABSTRACT

A method for the strengthening of glasses, glazes, cement, gypsum board, wood fiber board, mineral fiber board, lime or gypsum by adding fly or filter dust to the starting material after which the mixture is heated or not heated depending upon the product being manufactured. For glasses, glazes and other vitreous products (besides porous ceramic products) and cement the starting material is heated to above 1000° C. For gas concrete, gypsum board, wood fiber board and mineral fiber board the starting material is heated to from 100°-1000° C. For cement, lime and gypsum it is possible that no heating take place to the starting material.

4 Claims, No Drawings

METHOD FOR STRENGTHENING VITREOUS PRODUCTS AND COMPOSITION BOARDS

This is a continuation of application Ser. No. 366,113, filed June 1, 1973, now abandoned.

The present invention relates to a method for the manufacture of various products by the addition of fly or filter dust to the starting material after which the mixture is heated or not heated depending upon the product being manufactured. More particularly the present invention relates to the addition of fly dust to glasses, glazes and other vitreous products and cement in which melting respectively reaction takes place at temperatures above 1,000° C., to the addition of fly dust to gas concrete, gypsum board, wood fiber boards and mineral fiber boards where the product is heated to within the range of 100° to 1,000° C.; and to the addition of fly dust to cement, lime, gypsum or the like where no heating takes place.

It is known from U.S. application Ser. No.235,079 filed Mar. 15, 1972, that flue dust (fly or filter dust) and similar waste, secondary products obtained with different industrial processes can be used to manufacture porous ceramic bodies. These waste secondary products were previously discharged through chimneys into the surrounding atmosphere or released from within workshop locations. This type of emission has created difficult air pollution problems, but because of the introduction of stringent environment care and protection laws such waste, secondary products must now be collected in filters, dust separators and similar devices. One characteristic feature of waste dust is its minute particle size and enormous specific surface, which is often in excess of 20 m²/g. Further, such dusts contain different metal oxides, such as $SiO_2$, $MgO$, $Cr_2O_3$, $FeO$, $Fe_2O_3$, $Al_2O_3$, $MnO_2CuO$, $ZnO$, $ZrO_2$, $TiO_2$, $Ni_2O_3$, or $PbO$ in addition to some carbon and sulfur. The dusts are also often amorphous. Examples of such waste dusts/fly dust include:

(a) the condensed flue gases (fly or filter dust) obtained with the manufacture of ferro-silicon, containing between about 75 and 92 % $SiO_2$ and varying percentages of $MgO$, $Cr_2O_3$, $FeO$ together with some carbon and possibly also some sulphur, the dust being amorphous and having a specific surface of over 20 m²/g, (b) fly dust obtained with the manufacture of silicon-chrome or silicon-maganese, having a similar composition to the dust described in (a) above.

In addition to or in combination with these principal types can be mentioned many others, such as:

(c) filter dust and waste dust obtained with the manufacture of steel and containing about 90 % $Fe_2O_3$, (d) filter dust obtained with the manufacture of copper and containing 50–75 % $ZnO$ with so-called slag fuming, and (e) the fine powdery waste obtained when expanding perlits and containing 70–75 % $SiO_2$ and 12–15 % $Al_2O_3$. This dust is also amorphous.

The fly dusts under (a) and (b) are, in effect, very fine grain silica gel, which is, of course, very much cheaper than synthethic silica gel, which is too expensive for use as an additive in building materials. Further, the presence of some few percent metal oxides in the fly dusts, which is not found in synthetically produced silica gel, affords valuable advantages when using such dusts as additives.

It also is disclosed in U.S. pattent application No. 235,079 that each species of clay requires different combinations of additives, depending on the composition of the clay. Continued experiments have shown, however, new improvements in the qualities of porous clay products. Silica fume (fly dust) obtained when manufacturing silicon-manganese functions as a flux and thus renders clays poor in fluxing agents more usable. It is advantageous to add waste obtained when expanding perlite, which introduces a homogeneous mixture of amorphous $SiO_2$ and $Al_2O_3$. Finally it is an advantage also to add materials in powder form which dissociate in the region of 1000° C. and emit gases such as $CO_2$, Co, O, $H_2$, $SO_3$ etc., such as different carbonates, ferrochromites, pyrites, manganese dioxide etc. Certain clays can sometimes be improved by adding other clays such as bentonite, kaolin, feldspar, albite, nepheline syenite, cryolite, etc. In addition to acting as an additive, the co-action of fly dust with the other additives mentioned above often produces a synergistic effect.

To facilitate an understanding of the reaction taking place in the expansion of clay, it may be added that cells are formed by heating the clay to the temperature at which the gas-forming constituents give off gases in the form of small bubbles, which can be formed as soon as a pyroplastic condition has been reached. In most clays this takes place between 1,150° C. and 1,200° C. In most clays this takes place between 1,150° C. and 1,200° C. If the temperature is too high, the evolution of gas will be too sudden and irregular, and a major portion of the bubbles escapes before the cell walls start to solidify. At too high a temperature, the cell partition walls melt and the pore system is destroyed. This also occurs during a slow temperature rise within the pyroplastic range. By lowering the softening and sintering temperature of the material, solidification of the cell walls also will take place in an earlier stage, the pore system will be more uniform and losses of gas will be avoided. The organic constituents, of course, are decomposed in an earlier stage, but gas bubbles can be formed only when the consistency of the clay permits it. This softening also is favored by the inorganic substances which are decomposed between 1,000° and 1,150° C. Substances which are decomposed within this temperature range are e.g. certain carbonates, which in a reducing atmosphere yield $CO_2$ at a temperature about 100° to 200° C. lower than in an oxidizing atmosphere. Some $Fe_2O_3$-containing substances act similarly, e.g. waste dust from the production of steel but also minerals containing $Fe_2O_3$ which evolve oxygen in approximately the same temperature range, $MnO_2$, $Mn_2O_3$ etc. The result is that it is possible to obtain a homogeneous and even improved pore system below the expansion temperature otherwise used, if this temperature can be lowered some tens of degrees. This reaction is achieved by the new combination with fly-dust (silica fume) which provides an eutectic resulting in a lowered softening and sintering temperature between 1000° and 1150° C., thus contributing to making the mass more loose, whereby the cell system can be formed more easily.

Whereas the aforementioned procedures have been restricted to the expansion of clays, it has now been discovered that these fly dusts and waste dusts can be used in other connections also, these new fields of use being the object of the present application. The use of the material is divided into three different temperature ranges, (a) heating above 1000° C., (b) heating below 1000° C., and (c) no heating at all.

When the material is heated to temperatures above 1000° C. an eutectic is obtained which lowers the melting and sintering points of the material. This is an advantage when producing porous ceramic bodies in the form of large elements, requiring a heating period of from 1 - 5 hours, and in the form of small granulates, requiring a heating period of only a few minutes, as described in more detail in U.S. patent application No. 235,079. The U.S. patent application also mentions an unexpected reaction potential between different condensed flue gases (fly dust) and metal oxides having very high melting points, which enables highly refractive materials to be produced.

It has now been discovered that these special qualities also afford new aspects in the melting of glass and of glazing. In this connection, it is not only the new eutectic which plays such an important part, i.e. in lowering the melting point, but also the fact that highly resistant metal oxides can be incorporated in the material. With conventional glass melting processes it is only possible to introduce very small proportions of metal oxides into the material, since otherwise the temperatures required would be uneconomically high and difficulties would be created. It is a fact that metal oxides such as $Al_2O_3$ or MgO for example can only be melted into conventional glass in quantities below 5%. It is these metal oxides, however, which impart to glass a higher chemical and mechanical resistance, render it less sensitive to variations in temperature, increase its refractory properties and reduce its coefficient of expansion. Further, not only does each particle of the fly and waste dust contain the aforementioned oxides, but the powder is also amorphous. Apart from the fact that amorphous starting materials are able to form amorphous glass at lower temperatures, such materials are more reactive than the crystalline materials otherwise added to the glass melt. The reason for this is that crystalline materials have an orderly state, while the amorphous dust endeavors to regain an orderly crystal lattice. This also explains why crystalline mineral powders and metal oxides have higher melting points and can only be added in small quantities.

The reaction obtained when proceeding in accordance with the invention also permits the admixture of semi-crystalline powders, such as finely ground clay which can then be incorporated also at lower temperatures, thereby enabling the aluminium oxide content for example to be increased in an inexpensive manner.

The gas-forming substances, such as carbon and sulphur, normally enclosed in the dust particles also contribute to improving the glass melt, since the gases developing therefrom cause movement in the melt and homogenize and purify the same.

These new experiences lead to the conclusion that more resistant glass compositions can be obtained without the necessity of undertaking complicated and expensive measures or to admix expensive additives. It is possible to reduce the flux and alkali content, which compounds in glass, for example, due to leaching, are often responsible for reduction in the desired chemical resistance. Thus, it is possible to replace the expensive addition of boric acid in part and often in full and still obtain sufficient resistance against attack by water and against aggressive influences on the glass. It is possible to improve high resistant glass, such as laboratory glassware, apparatus glass and medicinal glass, which must be sterilized each time after use, and to render such glass less expensive, by replacing boric acid. The method of the invention, however, can also be applied to advantage with bottles and the like, since many liquids release the alkali from the glass. This latter disadvantage is avoided with glass produced in accordance with the invention, since this necessary flux is not present in the usual quantities. Similar advantages are obtained for window glass, which as a result of excessive alkali contents often gets etching or corroding stains (interference marks) during storage, when the individual sheets of glass lie close together.

The manufacture of glass fiber can be mentioned as a special example. In order to achieve a product which is highly resistant to chemical attack it is necessary to replace the alkali entirely with boric acid. Nevertheless, glass fiber - which because of its superior tensile strength serves as a reinformcement in many materials - cannot be used as a reinforcement in concrete, the high alkali content of which destroys the glass fibers. If there is added to the melt a few percent of silica fume obtained from ferrosilicon, ferrochrome or ferromanganese manufacturing processes together with a few percent of waste obtained from perlite expansion processes, or also a few precent of finely ground clay powder, not only is the $SiO_2$ content increased but an enrichment of the highly resistant metal oxides $Al_2O_3$, MgO, $Cr_2O_3$ etc., is also obtained. By proceeding in this manner, glass fibers are obtained which can be embodied in concrete, which hitherto has only been possible in respect of the excessively expensive types of special cement (e.g. aluminous cement). It is possible to admix loose glass fibers during blending of concrete but also to lay in (embed) mats of fiber glass, which may even be prestressed. It can be ordinary or light concrete. Thus, the method provides a solution long sought after by the concrete industry, superior to reinforcement by iron wires or wire-nettings with regard to corrosion and fissures in the concrete and higher tensile strength, specific for glass fibers. The same is also true for glass fiber reinforcements in plaster slabs, which are too acid for conventional glass fibers.

The aforementioned types of glass have been given by way of example, and are not restrictive to the novel method.

The fly dust or the like may be added to the starting material in quantities of between 1-20% by weight, preferably between 3-8% by weight. If a higher $Al_2O_3$ content is required, various types of silica dust are combined, these dusts in addition to $SiO_2$ containing various highly resistant metal oxides and $Al_2O_3$ - containing perlite wastes or clay powders.

When working at temperatures above 1000° C., it can be an advantage to admix fly dust (silica fume) with raw materials used in the manufacture of cement before burning the raw materials (limestone and cly) to clinkers. The advantage afforded by the combined eutectic and high $SiO_2$ content together with the other metal oxides is also obtained in this instance.

It also has been found, however, that the condensed flue gases also afford important advantages in manufacturing processes carried out in temperature ranges below 1000° C., in which a eutectic with subsequent lowering of the temperature is not obtained. The high content of $SiO_2$ and resistant metal oxides together with the extreme fineness of particle distribution improves the refractory properties of the final product and its mechanical strength. As a rule there are no chemical bonds formed, but only a protective incorporation is obtained. In combination with water glass, however, chemical binding with fly dust also is possible at the lower temperature range. Thus, there is obtained an improvement in the "bonding or impregnation composition" referred to in U.S. Pat. No. 3,707,386. Thus, it is possible to replace the organic binding agent in mineral fiber board with waterglass together with fly dust. Organically bound mineral fibers or wood fiber board can also be made more refractory and stronger by incorporating fly dust with the starting material or by coating the starting material with such fly dust. The method of the invention can also be applied to advantage with plaster board, which is another type of building board manufactured at relatively low temperatures. In all of the aforementioned cases, the additives are added in quantities between 1-20% by weight, preferably 3-8% by weight of the starting material.

Finally, in accordance with the invention fly dust also is able to give an improved effect without the application of additional heat. When admixing a few percent of fly dust (silica fume) with different binding agents, particularly hydraulic binding agents, a more rapid and more intensive reaction is obtained between basic cement or lime and the silica in the condensed silica fume. At the same time the powderous admixture is extremely fine, which also results in a stronger final product. Similar advantages are obtained when adopting this latter procedure in the manufacture of plaster board etc.

The present invention will be more fully defined hereinafter by reference to the following non-limiting examples of fields of application wherein all percentages are by weight unless otherwise stated.

(A) Class

The average glass-compositions are (according to C. J. Philips, Corning Glass Works, "Glass the Miracle Maker")

| for sheet and plate glass | |
|---|---|
| $SiO_2$ | 70.5 – 73 % |
| $Fe_2O_3 + Al_2O_3$ | 0.5 – 1.5 % (mostly $Fe_2O_3$) |
| CaO | 9 – 14 % |
| MgO | 0 – 3.5 % |
| $Na_2O$ | 12 – 16 % |

| for container glass | |
|---|---|
| $SiO_2$ | 70.4 – 75 % |
| $R_2O_3(Fe_2O_3 + Al_2O_3)$ | 0.5 – 3.1 % |
| CaO | 4.6 – 9.7 % |
| MgO | 0.3 – 4.3 % |
| BaO | 0.1 – 0.6 % |
| $Na_2O + K_2O$ | 15 – 17 % |

| for borosilicate glass | |
|---|---|
| $SiO_2$ | 80.5 % |
| $B_2O_3$ | 12.9 % |
| $Na_2O$ | 3.8 % |
| $K_2O$ | 0.4 % |
| $Al_2O_3$ | 2.2 % |

By adding 3 – 8% fly dust from the ferrosilicon, silicon-chrome or silicon-manganese production instead of the greater part (or even all) of the usual fluxing agents (alkali oxide or boric acid) a higher $SiO_2$-content is achieved and at the same time also a higher percentage of highly resistant metal oxides as $Al_2O_3$, MgO, ZnO etc. can be introduced owing to the attained eutectic. The aluminum oxide can be added in form of $Al_2O_3$-powder (possibly together with some phosphoric acid, forming aluminium phosphate, which is isomorph with $SiO_2$), perlite-powder, felspar, etc.; MgO f.inst. in form of magnesite or dolomite powder; ZnO as the cheap slag fuming (type d) of the cited fly dusts. In this way the content of alkali and/or boric acid can be reduced and the content of resistant metal oxides increased. Occasionally some fluorite ($CaF_2$) or cryolite (approx. 2%) can be added as fluxing agent.

A recommended final composition according to the present invention for sheet glass would be, for example:

| | |
|---|---|
| $SiO_2$ | 78 % |
| $Al_2O_3$ | 5 % |
| MgO | 5 % |
| $Na_2O$ | 6 % |
| CaO | 3 % |
| ZnO | 2 % |
| $CaF_2$ | 1 % |

Wide variations are, of course, possible within the scope of the invention.

(B) Glass fibers

Glass fibers have usually the above mentioned composition of a borosilicate glass. The melting process differs, however, from the ordinary glass production. Fiber glass is made by two different processes as staple fiber (glass wool) and as a continuous filament. Staple fiber is formed by causing molten glass to flow from extremely small orifices from which it is picked up by a high pressure steam or air blast into fibers up to 15 inches.

In the continuous filament process the glass is also made into marbles and these are melted in small electric platinum furnaces from which the molten glass flows out through 102 or more minute orifices. Now even direct melting (without marbles) is used by melting sand, limestone, felspar and boric oxide. To make the continuous fibers more alkali resistant and to lower the coefficient of expansion, addition of boric acid is considered as necessary, even if it is rather expensive. - However, the resistance of boric acid against alkali attack is not at all sufficient, which Dralle-Keppeler ("Glasfabrikation", page 1302) pointed out already 1926. Therefore, the extraordinary high tensile strength of glass fibers, which enables the optimal reinforcement in many combinations, cannot be exploited in alkaline environment. For that reason borosilicate glass fibers cannot be embodied in concrete, as the alkaline solutions, which are formed by the hydration of the cement, affect the glass fibers. This decay of the glass fibers is the more risky, as the fibers must have a very minute diameter based on the fact that the tensile strength per surface unit increases with diminishing diameter. It is known that concrete has a very high compressive strength, whilst the tensile strength is relatively poor. Therefore reinforcement by steel wire or steel nettings is applied, but this is not always reliable owing to the corrosion and arising fissures on the tension spots, particularly when used under water by the aggression of salt water Because of that, many trials have been made to adopt the glass fibers to the requirements in concrete. There are a lot of recommendations to cover the glass fibers with protecting layers, which have not the expected effect. Neither gassing of the still fluid concrete during mixing for neutralizing the high alkaline condition by $CO_2$ is not sufficient and too complicated.

The best solution is, of course, to change the composition of the glass and to make not only the surface but the whole core of the glass resistant against alkali attack. This is possible by introducing metal oxides having such properties. Dralle-Keppeler quotes already 1926 that $ZrO_2$ would be suitable to improve the alkali resistance of glass, but the high melting temperature and the costs make a practical use nearly impossible. Lastly it was proposed to lower the melting temperature to approximately 1320° C by special compositions, which replace boric acid by ca 10% $ZrO_2$, but then so high an alkali metal oxide content as about 20% (chiefly $Na_2O$) is required, and this is not an ideal solution. The eutectic possible by the condensed silica fumes (particularly the dust from the silicon-manganese production, which also has fluxing properties) allows a practical melting temperature without a high content of alkali or boric acid for introduction of $ZrO_2$. The effect gets still better, if also ZnO is added, which (beside MgO) gives glasses the lowest expansion coefficient and furthermore improves the tensile and compressive strength. Even in this case the high price and the high melting point were prohibitive for a larger application. The cheap slag fuming with 50 - 75% ZnO enables an inexpensive addition of ZnO. Sometimes it is also advantageous to improve the resistibility against acid attack, which can cause a passivity of the surface of glass fibers. This is attained by increasing the acid elements in the glass composition, for instant by enhancement of $SiO_2$ or addition of some $TiO_2$. (Titanium dioxide reacts with the sulfuric acid in polluted air to titanium sulfate, which is not soluble in acids).

By these combinations a glass composition optimal for glass fibers can be reached, as follows:

| | | | |
|---|---|---|---|
| $SiO_2$ | | 70 – 80 % or as more exact ex: | 75 % |
| $ZrO_2$ | | 5 – 10 % | 6 % |
| ZnO | | 3 – 10 % | 3 % |
| $Al_2O_3$ | | 0 – 5 % | 3 % |
| MgO | | 0 – 5 % | 3 % |
| $B_2O_3$ | | 0 – 8 % | 3 % |
| alkali oxide | | 0 – 8 % | 3 % |
| CaO | ca | 2 % | 1.5 % |
| $TiO_2$ | ca | 2 % | 1.5 % |
| MnO | | 0 – 2 % | 0.5 % |
| $CaF_2$ | | 0 – 2 % | 0.5 % |

(C) Mineral and Wood Fiber Board

The raw materials generally used for the manufacture of mineral fiber board are:

| | |
|---|---|
| mineral wool | 50 – 85 % |
| clay | 0 – 25 % |
| expanded perlite (nos as powder) | 0 – 20 % |
| starch (bonding agent) | 5 – 15 % |
| water repellants | 0.1 – 0.5 % |

In the manufacturing process the ingredients are slurried in water at a consistency of about 2% and formed into a sheet by flowing unto a moving screen through which the free water drains. The semi-dry sheet is passed between rollers to provide a controlled thickness and the entrapped water is removed in a forced hot air oven.

In wood fiber board manufacture the raw material is a relatively coarsely refined wood fiber with small quantity (0.5 – 2%) of a water repellant. The board is formed similar to the mineral fiber board. Both boards are more or less combustible, even the mineral fiber board to some degree because of the starch as bonding agent. By mixing in approximately 5% (based on the dry raw material) of fly dust, both the mechanical strength, but particularly the resistance against fire is improved. In combination with the waterglass bonding according to U.S. patent 3,707,386 the starch can even be replaced by sodium silicate and the bonding gets stronger owing to the addition of flue dust. It is also possible to make only a fireproof coating by these means.

(D) Hydraulic bonds

Hydraulic bonds which harden together with water and even under water, as cement, burnt clay, burnt lime and gypsum (plaster), can be strengthened by adding 1 – 20%, preferably 3 – 8% fly dust. The effect is achieved both in normal ambient as in higher temperature. Plaster board is dried at about 300° C, gas concrete is made in autoclaves at about 200° C. As to cement the fly dust can be mixed with the raw materials (limestone and clay) before burning to clinkers in rotary ovens at a temperature up to 1400° C.

What is claimed is:

1. In a method of making glass, glaze or cement which comprises preparing a batch of raw-materials to form glass, glaze or cement and heating said batch to a temperature above 1000° C. for a period of from a few minutes to 5 hours to convert said batch into glass, glaze or cement, the improvement which comprises including in said batch, before said heating takes place, from 1 to 20% by weight of said components of amorphous fly or filter dust having a specific surface area of at least 20 $m^2/g$ and containing from 75% to 92% $SiO_2$ and the remainder compounds selected from the group consisting of MgO, $Cr_2O_3$, FeO, $Fe_2O_3$, $MnO_2$, CuO, ZnO, $ZrO_2$, $TiO_2$, $Ni_2O_3$, PbO, C, S and mixtures thereof to form a eutectic which lowers the melting and sintering points of the raw material.

2. The method of claim 1 in which the fly dust is present in a quantity of from 3–8% by weight.

3. In a method of making gypsum board, or mineral fiber board, which comprises preparing a batch of raw-materials for said board and compressing said batch while heating it from 100°–1000° C. to produce said board, the improvement which comprises adding to said batch, before heating and compression, from 1 to 20% by weight of said components of amorphous fly or filter dust having a specific surface area of at least 20 $m^2/g$ and containing from 75% to 92% $SiO_2$ and the remainer compounds selected from the group consisting of MgO, $Cr_2O_3$, FeO, $Fe_2O_3$, $Al_2O_3$, $MnO_2$, CuO, ZnO, $ZrO_2$, $TiO_2$, $Nl_2O_3$, PbO, C, S and mixtures thereof.

4. The method of claim 3 in which the fly dust is present in a quantity of from 3–8% by weight.

* * * * *